July 10, 1956
A. G. SCHRAMM
2,754,128
LATCH MECHANISM FOR ELEVATABLE BED TRAILERS
Filed June 20, 1955
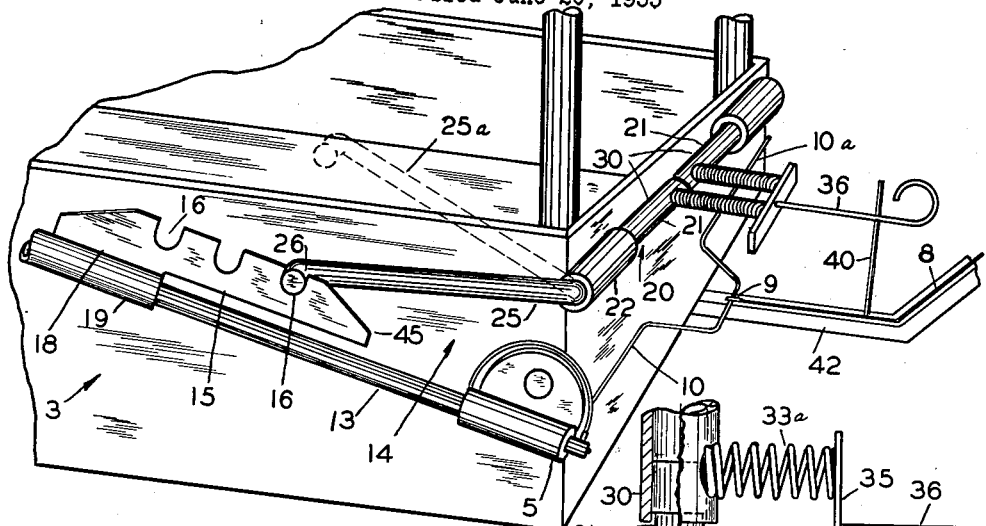
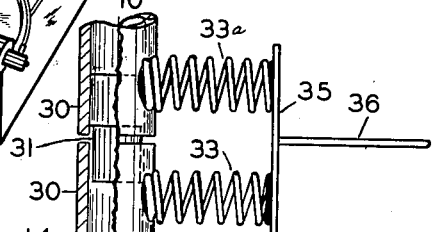
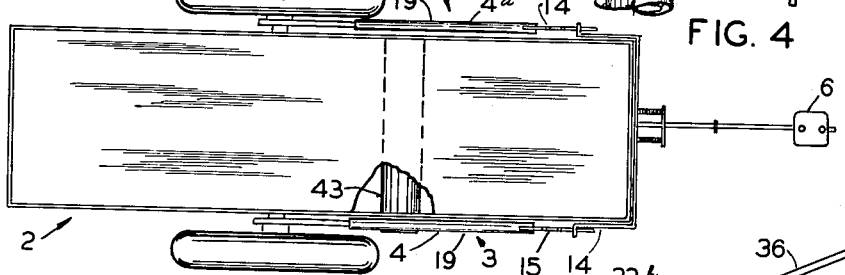
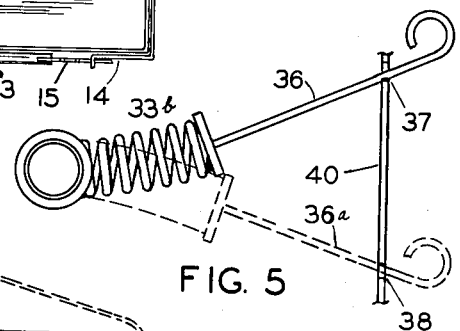
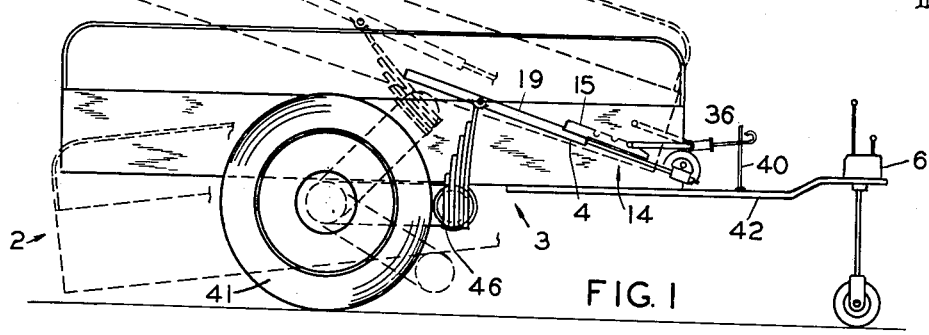
INVENTOR.
Arthur G. Schramm
BY Scott L. Norvell
Atty.

United States Patent Office 2,754,128
Patented July 10, 1956

2,754,128

LATCH MECHANISM FOR ELEVATABLE BED TRAILERS

Arthur G. Schramm, Phoenix, Ariz.

Application June 20, 1955, Serial No. 516,444

3 Claims. (Cl. 280—44)

This invention concerns a latch for elevatable bed trailers of the type illustrated and described in my Patent No. 2,452,267.

Trailers of this type are provided with lifting mechanism including hydraulically operated cylinders, pistons and sleeve guides on each side of the trailer body wherein the cylinder heads are pivotally attached to the front end of the bed of the trailer and sleeve guides are pivotally attached to springs on each side of the trailer body which operate arms carrying the wheels.

One of the problems attendant to the operation of such device is to provide a latching means to hold the lifting mechanism at any desired position, and will latch the guide sleeve relative to the cylinder and trailer bed at different desired positions along the length of its travel on the cylinder. The latch must be constructed so that it will tend to go into latched position, when desired, and conversely, when it is desired to unlatch the sleeve, the latch will tend to move to an unlatched position whenever the strain of the load is removed from the latching elements.

In view of the foregoing one of the objects of this invention is to provide latches operating on both sides of an elevatable bed trailer body and adapted to engage notches on an element attached to a sliding member, such as a guide sleeve, of a hydraulic lifting mechanism when desired and to disengage from said notches when desired;

Another object is to provide a latching mechanism for hydraulic jacks operating on each side of an elevatable bed trailer having a resilient control so that a manually operating lever on the trailer body may be positioned in latching position so that latch pawls will be resiliently urged to engage notches on sliding members of each of said hydraulic lifting mechanisms whenever the pawls and notches are in register, and conversely, when the operating lever is moved to unlatching position the pawls will be resiliently urged to disengage from notches in the sliding members whenever lack of frictional engagement will permit;

Another object is to provide a manually operating control for latching and unlatching sliding members of hydraulic lifting jacks positioned on each side of a trailer bed, which control can be disposed on the body of said trailer adjacent the hydraulic pump operating mechanism and may be operated by a simple selective motion on the part of the user.

I attain the foregoing objects by means of the construction, parts, devices and combinations of parts shown in the accompanying drawings, in which—

Figure 1 is a side view of a trailer having an elevatable bed operated by hydraulic lifting jacks controlled by my improved latching mechanism;

Figure 2 is a plan view thereof;

Figure 3 is a perspective view of one side of the trailer showing the details of the latch and unlatching mechanism, and drawn on an enlarged scale;

Figure 4 is a plan view of the resilient dual latch control mechanism; and

Figure 5 is a side elevation thereof.

Similar numerals refer to similar parts in the several views.

As illustrated, numeral 2 refers to the trailer body and 3 indicates in general the lifting mechanism while 4 indicates a hydraulic lifting jack which is operated by a pump 6.

As shown in Figure 2 there are lifting jacks on each side of the trailer bed and these are indicated by numerals 4 and 4a. The pump 6 forces fluid through tube 8 to a T fitting 9 and from this through tubes 10 and 10a which extend right and left respectively, to the jacks 4 and 4a. Operation of the pump to raise and lower the trailer by means of the jacks is well known to the art.

I have found that in operation it is necessary to have the latch control adjacent to and within easy reach of the pump 6, which in this case is a manually operated piston pump, and is mounted on draw bar 42.

Latches, generally indicated by numeral 14, consist of notched bars 15, having a plurality of notches 16 on their upper sides or edges, welded at 18 to the lower open end portions of guide tubes 19. These bars extend beyond the lower ends of the respective tubes, and over cylinders 13 of jacks 4 and 4a.

On each side of the trailer body there are L-shaped latch arms 20 which have shaft front portions 21, transverse to the trailer body, which are journalled in sleeve bearings 22, attached to the front portion of the trailer body near its sides, and rearwardly, longitudinally extending latch arms 25 on each side of the trailer body. At the rear ends of longitudinal bars 25 there are latch pawls 26 which extend outwardly and transverse to notch bars 15 and are disposed so as to register with and engage any one of notches 16.

The inner end portions of the front portions 21 of arms 20 are aligned and adjacently positioned, and are each attached to and enclosed by sleeves 30 which are virtually a part of shaft portions 21. The inner ends of these sleeves abut and are kept in alignment by a short shaft 31 on which they turn.

Near the abutting ends of each of these sleeves there are stiff coil springs 33 and 33a. These are attached to the sleeve 30 a short distance from their ends and extend forward, radially. The outer ends of springs 33 and 33a are attached to and joined by a yoke 35. Operating lever 36 extends forwardly from the middle of this yoke and is disposed so that it may be engaged in notches 37 or 38 in upright plate 40 which is attached to and extends upward from the trailer draw bar 42.

When the operating lever 36 is in the raised position and inserted in notch 37 springs 33 and 33a are placed under tension as indicated by the curved portion 33b, Figure 5, and this tension tends to rotate sleeves 30 and the front portion of latch bars 20 counter-clockwise as viewed particularly in Figure 3. The pawl 26 on the end of the arm portion 25 is therefore urged downward so that as sleeve 19 moves bar 15 toward the head 5 of cylinder 13 the nose 45 of bar 15 raises bar 25 slightly and as soon as the first notch 16 registers with pawl 26 it slips into place and latches sleeve 19 relative to bar 25 and therefore relative to the trailer body 2.

When it is desired to unlatch the sleeve the operating lever 36 is moved to the lower position as indicated by dotted lines 36a, Figure 5. This movement places a strain on both forward bars 20 which tends to rotate them in a clockwise direction and this will, in turn, tend to move or urge bars 25 out of notches 16 and to the position indicated by dotted outline 25a, Figure 3.

By manipulating the control lever 36 to the latching position, as shown in solid lines in Figure 5, the second or third notch 16 may be engaged by pawl 26 in the same manner as the first notch was engaged.

Even though the wheel arms 46 carrying the wheels 41 are connected by torsion shaft 43 to move in unison, it has been found that it is impossible to cause both latch arms to engage notches at the same time. Due to inequalities of the load on the trailer or the position of the wheels on the ground, or the unequal response from either the right or the left piston to oil pressure from the pump, the notches 16 do not move into register at exactly the same time. It is for this reason that the latch bars 20 are made separate and are moved and urged resiliently through the means of the springs 33 and 33a. Thus, when the operating lever 36 is moved to the latching position, as shown, the latch bars 25 carrying pawls 26 are independently urged toward engagement with notches 16 on the latch bars 15 on each side of the trailer body. In this way the notches are engaged as soon as they come into registering position and the notch on one side of the trailer is not made dependent upon the notch on the other side of the trailer for engagement. Likewise when the control lever urges the latches to disengagement one pawl is not dependent upon the other for its operation, but each is released independently just as soon as the frictional engagement with the side edges of the notches 16 is released. The unitary control provided in this way may be conveniently mounted adjacent pump 6 and the operator need not change his position while raising or lowering the trailer.

I claim:

1. In an elevatable bed trailer having a bed body with a draw bar and wheels supported on wheel arms on each side of the bed body operated by hydraulic jacks including cylinders pivotally mounted on the front portion of each side of said bed, pistons operating therein and sleeve guides slidably operating on said cylinders, latch mechanism for holding said wheel arms in raised or lowered position, as determined by the position of said sleeves on said cylinders, consisting of notched bars, having notches on their top edges, attached to the upper faces of the lower end portion of said sleeves and extending over said jack cylinders in parallel relation therewith, L-shaped latch bars having transverse front portions, journalled in aligned relation on the front of said bed body with their ends adjacently positioned, and rearwardly extending latch arms, joined to said transverse front portions, having transversely extending pawls at their rear ends adapted to engage the notches on said notched bars when in lowered position, contacting the top edges of said latch bars, and an operating lever resiliently attached to each of said latch bars independently, releasably held in raised or lowered position by engagement in upper and lower notches in an upright plate attached to said draw bar; said latch arms being resiliently and independently urged toward said notched bars when said operating lever is in raised position and tending to engage in notches thereon, and said arms being resiliently and independently urged from said notched bars when said operating lever is in lowered position.

2. In an elevatable bed trailer having a bed body with a draw bar and wheels supported on wheel arms on each side of the bed body operated by hydraulic jacks including cylinders pivotally mounted on the front portion of each side of said bed, pistons operating therein and sleeve guides slidably operating on said cylinders, latch mechanism for holding said wheel arms in raised or lowered position, as determined by the position of said sleeves on said cylinders, consisting of notched bars, having notches on their top edges, attached to the upper faces of the lower end portion of said sleeves and extending over said jack cylinders in parallel relation therewith, transverse pawls on latch arms pivotally mounted on the fore part of said trailer body, and an operating lever, resiliently and independently connected to each of said latch arms, adapted to be secured in a position to resiliently urge said arms and pawls to engage any of said notches in said notch bars, and to be secured in a position to urge said pawls to disengage from notches in said notch bars.

3. In an elevatable bed trailer having a bed body with a draw bar and wheels supported on wheel arms on each side of the bed body connected to turn together by a transverse torsion shaft and operated by hydraulic jacks including cylinders pivotally mounted on the front portion of each side of said bed, pistons operating therein and sleeve guides slidably operating on said cylinders, latch mechanism for holding said wheel arms in raised or lowered position, as determined by the position of said sleeves on said cylinders, consisting of notched bars, having notches on their top edges, attached to the upper faces of the lower end portion of said sleeves and extending over said jack cylinders in parallel relation therewith, L-shaped latch bars having transverse front portions, journalled in aligned relation on the front of said bed body with their ends adjacently positioned, and rearwardly extending latch arms, joined to said transverse front portions, having transversely extending pawls at their rear ends adapted to engage the notches on said notched bars when in lowered position, contacting the top edges of said latch bars, and an operating lever resiliently attached to each of said latch bars independently, releasably held in raised or lowered position by engagement in upper and lower notches in an upright plate attached to said draw bar; said latch arms being resiliently and independently urged toward said notched bars when said operating lever is in raised position and tending to engage in notches thereon, and said arms being resiliently and independently urged from said notched bars when said operating lever is in lowered position.

References Cited in the file of this patent

UNITED STATES PATENTS

| | | |
|---|---|---|
| 2,452,267 | Schramm | Oct. 26, 1948 |
| 2,680,339 | Murphy | June 8, 1954 |